United States Patent [19]
Koops et al.

[11] Patent Number: 5,973,823
[45] Date of Patent: Oct. 26, 1999

[54] METHOD FOR THE MECHANICAL STABILIZATION AND FOR TUNING A FILTER HAVING A PHOTONIC CRYSTAL STRUCTURE

[75] Inventors: Hans Koops, Ober-Ramstadt; Wolfgang Dultz, Frankfurt; Manfred Eich, Muehtal, all of Germany

[73] Assignee: Deutsche Telekom AG, Bonn, Germany

[21] Appl. No.: 08/896,915

[22] Filed: Jul. 22, 1997

[51] Int. Cl.$^6$ .................................................. G02F 1/03
[52] U.S. Cl. ........................... 359/322; 359/245; 359/250; 359/252; 264/1.1; 349/104
[58] Field of Search ..................... 359/245, 250, 359/252–254, 296, 321, 322; 349/104, 105, 193; 156/99; 427/596; 264/1.1, 1.21, 1.36

[56] References Cited

U.S. PATENT DOCUMENTS

| | | | |
|---|---|---|---|
| 4,021,674 | 5/1977 | Koops | 250/492 |
| 5,414,541 | 5/1995 | Patel et al. | 359/39 |
| 5,600,342 | 2/1997 | Pikulski et al. | 343/909 |
| 5,600,483 | 2/1997 | Fan et al. | 359/344 |
| 5,684,817 | 11/1997 | Houdre et al. | 372/45 |
| 5,689,275 | 11/1997 | Moore et al. | 343/786 |
| 5,748,057 | 5/1998 | De Los Santos | 333/134 |
| 5,751,466 | 5/1998 | Dowling et al. | 359/248 |
| 5,784,400 | 7/1998 | Joannopoulo et al. | 372/96 |
| 5,802,236 | 9/1998 | DiGiovanni et al. | 385/127 |
| 5,818,309 | 10/1998 | De Los Santos | 333/176 |

*Primary Examiner*—Georgia Epps
*Assistant Examiner*—Margaret Burke
*Attorney, Agent, or Firm*—Kenyon & Kenyon

[57] ABSTRACT

A method for mechanically stabilizing and for tuning a filter having a photonic crystal structure The cavities of the filter fabricated as a photonic crystal structure are filled with optically transparent material having an adjustable refractive index. The optical properties of the filter and, thus, the filtering action are adjusted by way of an electric field having a variable field strength.

It is possible to produce small-dimensioned, narrow-band filter elements, which are finely tunable and tunable within a broad range, and to realize them as filter elements which are integrated with a high packaging density.

16 Claims, 2 Drawing Sheets

METHOD FOR THE MECHANICAL STABILIZATION AND FOR TUNING A FILTER HAVING A PHOTONIC CRYSTAL STRUCTURE

FIELD OF THE INVENTION

The present invention relates to a method of making filters for use with optical fibers which transmit data.

RELATED TECHNOLOGY

Tunable filters for optical information and communication technology and for telecommunication engineering are realized at the present time in the form of long optical fibers, which obtain their filtering action from Bragg diffraction gratings written into special fibers by means of UV light. See, in this regard:

R. Kashyap, "Photosensitive Optical Fibers: Devices and Applications", Opt. Fibres Techn. 1, 17–34, (1994).

In this context, considerable technological demands are placed on the manufacturing of these diffraction gratings with a high precision over long lengths of a few mm up to cm. Special methods are applied to reduce the "stitching" error encountered in electron beam lithography. See:

H. W. P. Koops, J. Kretz, M. Weber, "Combined Lithographies for the Reduction of Stitching Errors in Lithography", Proc. EIPB 94, J. Vac. Sci. Technol. B 12 (6) (1994) 3265–3269, and V. V. Wong, J. Ferrera, J. N. Damask, T. E. Murphy, H. A. Haus and H. I. Smith, "Distributed Bragg Grating Integrated-Optical Filters: Synthesis and Fabrication" J. Vac. Sci. Technol. B 13(6) Nov./Dec. 1995, pp. 2859–2864.

Inserting fiber filters into a macroscopic optical arrangement, always requires using plug-in or splice connectors in a hybrid technology. Such connectors do not facilitate miniaturization of the modules.

Using the method of additive lithography through computer-controlled, electron-beam induced deposition, photonic crystals are structurally formed with nanometer precision as miniaturized 2- and 3-dimensional arrangements of long, miniaturized needles made of dielectric materials. In this context, see H. W. P. Koops, R. Weiel, D. P. Kern, T. H. Baum, "High Resolution Electron Beam Induced Deposition", Proc. 31, Int. Symp. on Electron, Ion, and Photon Beams, J. Vac. Sci. Technol. B 6 (1) (1988) 477.

These can be directly installed in the optical path. The method's customary, highly precise computer control of the electron beam with respect to location, time and moving direction makes it possible to produce virtually all required geometrical shapes for the crystals and to achieve the deformation selected for the desired optical purpose. This allows one to tailor optical performance characteristics for the structure. The application of non-linear optical material is described by M. Eich, H. Looser, D. Y. Yoon, R. Twieg, G. C. Bjorklund in "Second Harmonic Generation in Poled Organic Monomeric Glasses", J. Opt. Soc. Am. B, 6, 8 (1989) and by M. Eich, A. Sen, H. Looser, G. C. Björklund, J. D. Swalen, R. Twieg, D. Y. Yoon in "Corona Poling and Real Time Second Harmonic Generation Study of a Novel Covalently Functionalized Amorphous Nonlinear Optical Polymer", J. Appl. Phys., 66, 6 (1989). A strong electric field is applied to the non-linear optical material to electrically adjust the optical path in the crystal and, thus, its properties. The same effect is achieved when an electric field is applied to a liquid crystal structure. For this, see M. Stalder, P. Ehbets, "Electrically Switchable Diffractive Optical Element for Image Processing", Optics Letters 19, 1 (1994). Thus, by varying the electric field, both when working with non-linear optical material, as well as with liquid crystals, the optical transmittance characteristic is able to be shifted in fine steps. It is likewise possible to vary the optical specular reflection effect, the reflection direction and, possibly, the strength.

Also known is a method for producing photonic crystals with the aid of multiple-beam writing devices. In accordance with this method, the photonic crystals are produced very economically by means of corpuscular beams and with the aid of additive lithography.

In this regard, see

H. Koops 1974, Patent Application P 2446 789.8-33 "Korpuskularstrahl-Optisches Gerät zur Korpuskelbestrahlung eines Präparates" [Charged-Particle [Corpuscular] Beam Optical Apparatus for Irradiating a Specimen in a Two-Dimensional Pattern], U.S. Pat. No. 4,021,674;

H. Koops, 1974, Patent Application German Patent 2460 716.7 "Korpuskularstrahl-Optisches Gerät zur Korpuskelbestrahlung eines Präparates" [Charged-Particle [Corpuscular] Beam Optical Apparatus for Irradiating a Specimen in a Two-Dimensional Pattern];

H. Koops 1974, German Patent Application 2460 715.6 "Korpuskularstrahl-Optisches Gerät zur Korpuskelbestrahlung eines Präparates in Form eines Flächenmusters mit mehreren untereinander gleichen Flächenelementen" [Charged-Particle [Corpuscular] Beam Optical Apparatus for Irradiating a Specimen in the Form of a Surface Pattern having a Plurality of Surface Elements Equal Among Each Other];

H. Koops 1975, German Patent Application P 2515 550.4 "Korpuskularstrahl-Optisches Gerät zur Abbildung einer Maske auf ein zu bestrahlendes Präparat" [Charged-Particle [Corpuscular] Beam Optical Apparatus for the [Photo-] Imaging of a Mask on a Specimen to be Irradiated];

M. Rüb, H. W. P. Koops, T. Tschudi, "Electron Beam Induced Deposition in a Reducing Image Projector", Microelectronic Engineering 9 (1989) 251–254; and H. Elsner, H. -J. Döring, H. Schacke, G. Dahm, H. W. P. Koops, "Advanced Multiple Beam-Shaping Diaphram for Efficient Exposure", Microelectronic Engineering 23 (1994) 85–88.

Photonic crystals having band gaps are two- and three-dimensional dielectric structures, in which it is forbidden to propagate electromagnetic waves, in dependence upon or independently of their direction of propagation. Calculations and microwave measurements have revealed that a cubically surface-centered, or also a two-dimensional cubical configuration of holes in a dielectric matrix or of dielectric rods exhibit photonic band gaps of this kind. In this context, six planes already suffice to achieve high quality elements. Two- and three-dimensional structures of this kind are often referred to as "photonic crystals".

SUMMARY OF THE INVENTION

An aim of the present invention is to provide a method for manufacturing a tunable filter on the basis of photonic crystals. The present invention can allow for making the tunable filter mechanically stable.

At the same time, the intention is to achieve highly variable filter properties.

The basic module of the filter of the present invention is produced using the known method of additive lithography, through use of computer-supported, electron-beam induced deposition, as a two- and three-dimensional arrangement of long, miniaturized needles of dielectric materials. Because of the needle-shaped crystal structure, the basic module of the filter of the present invention produced in this manner has little mechanical load-bearing capacity.

In accordance with the present invention, the gaps of the needle-shaped crystal structure are filled with optically transparent material having an adjustable refractive index, forming a tunable filter. Suitable, in particular, for the filling, which effects the desired mechanical stability of the component, are non-linear optical materials, i.e., liquid crystals. The filter is tuned through the action of an electric field on the filter and, in particular, on the transparent material of the filling. The electric field is preferably produced using magnetoresistors disposed in the vicinity of the filter. Through the linear, optical material coefficient, the electric field effects a change in the refractive index in the filled crystal cavity. The properties and, thus, the filtering action of the filter, change in response to the change in the refractive index. The following effects can be achieved by changing the field strength:

fine tuning of the wavelength range of the filter transmission;

fine tuning of the light phase shift;

fine tuning of the light's transmitting amplitude;

change in the refractive index and, thus, change in the reflection direction for the transmitted and for the reflected light.

When the basic filter element is produced using the known method of additive lithography using computer-supported electron-beam induced deposition, it is likewise possible to already selectively influence the desired filter structure. Using programmed modulation, which is overridden when the crystal cells are fabricated, optical properties, such as focusing or predeflection are able to be selectively influenced. If a plurality of perhaps variably tunable photonic crystals are constructed sequentially on depressions specially introduced into the waveguide patterns, then one can achieve a high level of miniaturization of filters and of optical resonators for laser applications. This renders possible a high [component] density.

The method of the present invention makes it possible to produce small-dimensioned, narrow-band filter elements, which are finely tunable and tunable within a broad range, and for them to be realized as filter elements which are integrated with a high packaging [component] density. As a result, a multiplicity of integrated optical components and circuit arrangements can be improved upon and produced in a novel way as miniaturized optics. This relates, for example, to tunable, electromagnetic micro-resonators for single-mode, light-emitting diodes, these structures suppressing the spontaneous emission in [what is] now an adjustable, broad wavelength range and, by this means, reducing the power requirements and increasing the reliability of light emitters, particularly of optical arrays. In addition, it is possible to have a strengthened spontaneous emission from finely tunable light emitters. This renders possible a faster modulation rate for optical connections and switches. High-quality optical mirrors can be constructed with customized finely adjustable reflection and transmission capabilities, with geometrically preset wavelengths and bandwidths, as miniaturized optical mirrors and with a high packaging [component] density. It is likewise possible to produce compact, electrically tunable narrow band filters (0.5–1 nm), polarizers, and tunable band-pass filters for selecting polarization. Optoelectronic elements can be selectively pumped within an adjustable wavelength range. A finely adjusted, directed decoupling of light in a predefined and variable direction is achievable. Waveguides and Y-couplers can be produced in nearly every adjustable form, and with ultra small, adjustable radii of curvature, as can very effective, finely adjustable microwave antennas.

BRIEF DESCRIPTION OF THE DRAWINGS

The present invention may be more easily understood with reference to the following figures, in which.

DETAILED DESCRIPTION

Figure 1:
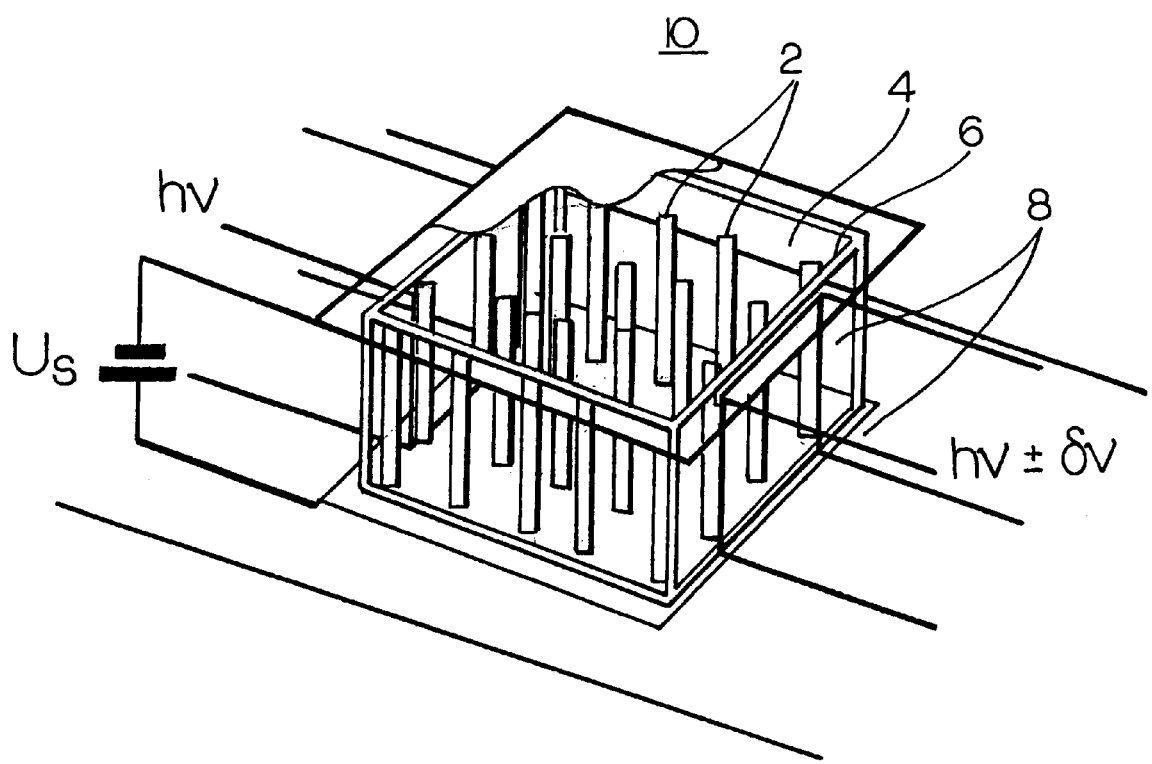
FIG. 1 shows a perspective schematic representation of a filter in accordance with the method of the present invention.

FIG. 1 depicts a filter 10 in accordance with the present invention disposed in a single-mode optical waveguide. Dielectric needle-shaped crystals 2 form a multi-dimensional arrangement. Gaps 4 in the needle-shaped crystal structure are filled with optically transparent filling material 6 having an adjustable refractive index. Electrodes 8 having an applied voltage $U_s$ produce an electric field in the filter, and in particular in the filling material 6 to enable a change in the refractive index of the filling material.

Figure 2:
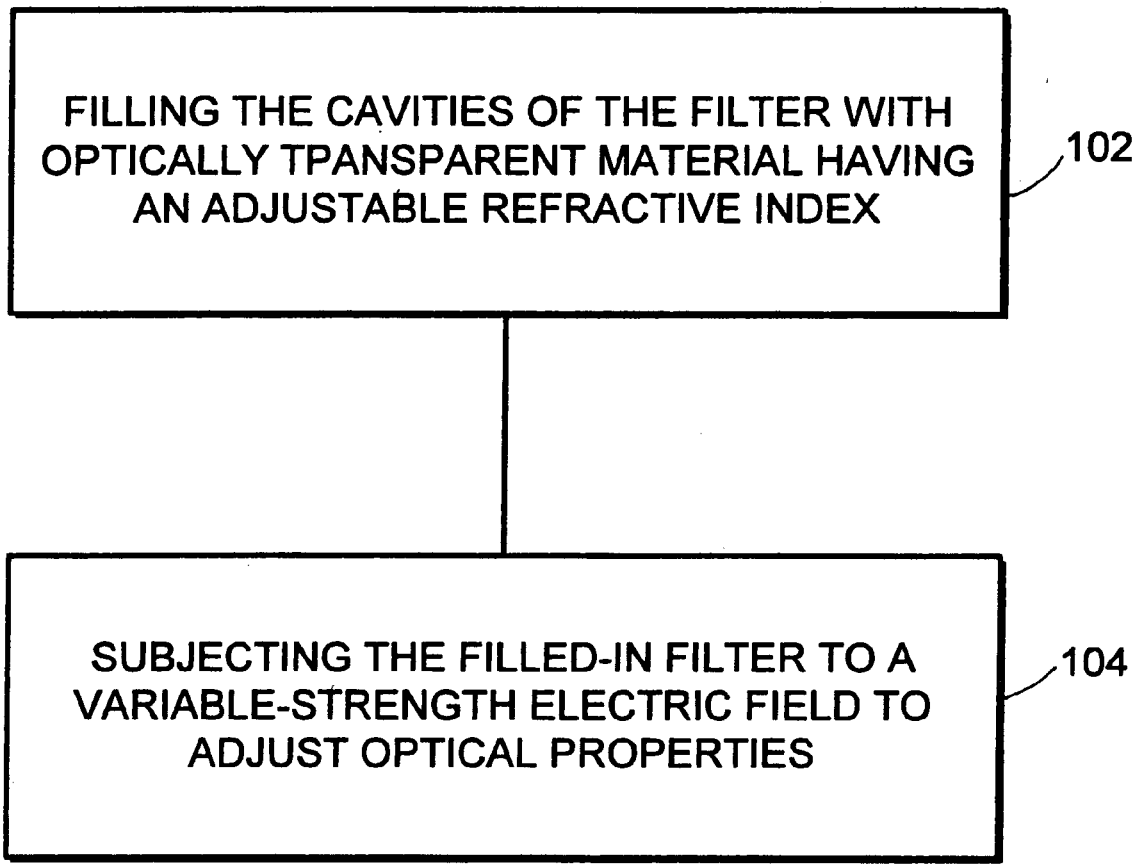
FIG. 2 shows a block diagram of a method in accordance with the present invention.

FIG. 2 shows a block diagram of the method of the present invention. As shown in block 102, the cavities of the filter are filled with optically transparent material. The material as embodied herein is a nonlinear optical material, such as liquid crystals. As shown in block 104, the filled-in filter is subjected to a variable field-strength electric field to adjust optical properties. By selectively changing the electric field, optical properties, such as the refractive index of transmitted and reflected light in the crystal cavity, the amplitude of transmitted light, and the light's phase shift, may be adjusted. The level and variability of the electric field strength may be determined computationally as a function of the desired optical properties.

What is claimed is:

1. A method for mechanically stabilizing and for tuning a filter having a photonic bandgap crystal structure made using additive lithography through computer-controlled, electron-beam induced deposition, the photonic bandgap crystal structure having a multi-dimensional array of dielectric elements forming cavities, the method comprising the steps of:

filling the cavities of the filter with optically transparent material having an adjustable refractive index; and subjecting the filled-in filter to a variable field-strength electric field, wherein by selectively changing a field strength of the electric field, the optical properties of the filter can be adjusted.

2. The method as recited in claim 1 wherein the adjustable optical properties include a refractive index of transmitted and reflected light in the cavities.

3. The method as recited in claim 1 wherein the adjustable optical properties include an amplitude of transmitted light.

4. The method as recited in claim 1 wherein the adjustable optical properties include a phase shift of light.

5. The method as recited in claim 1 wherein the optically transparent material is non-linear optical material.

6. The method as recited in claim 1 wherein the optically transparent material is liquid crystals.

7. The method as recited in claim 1 further comprising the step of determining the adjustment and variability of the field strength of the filter computationally as a function of the desired optical properties.

8. The method as recited in claim 2 wherein the optically transparent material is non-linear optical material.

9. The method as recited in claim 2 wherein the optically transparent material is liquid crystals.

10. The method as recited in claim 2 further comprising the step of determining the adjustment and variability of the field strength of the filter computationally as a function of the desired optical properties.

11. The method as recited in claim 3 wherein the optically transparent material is non-linear optical material.

12. The method as recited in claim 3 wherein the optically transparent material is liquid crystals.

13. The method as recited in claim 3 further comprising the step of determining the adjustment and variability of the field strength of the filter computationally as a function of the desired optical properties.

14. The method as recited in claim 4 wherein the optically transparent material is non-linear optical material.

15. The method as recited in claim 4 wherein the optically transparent material is liquid crystals.

16. The method as recited in claim 4 further comprising the step of determining the adjustment and variability of the field strength of the filter computationally as a function of the desired optical properties.

* * * * *